US006459750B1

United States Patent
Itoo et al.

(10) Patent No.: US 6,459,750 B1
(45) Date of Patent: Oct. 1, 2002

(54) TURBINE GENERATOR AND OPERATING METHOD THEREOF, AND NUCLEAR POWER PLANT AND OPERATING METHOD THEREOF

(75) Inventors: Kazutoshi Itoo, Hitachi; Kenya Ohashi, Hitachinaka; Kazumi Fujii; Takahiko Sano, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 09/585,333

(22) Filed: Jun. 2, 2000

(30) Foreign Application Priority Data

Jun. 3, 1999 (JP) .......................... 11-156040

(51) Int. Cl.[7] .............................................. G21C 15/00
(52) U.S. Cl. ........................................................ 376/402
(58) Field of Search .......................................... 376/402

(56) References Cited

U.S. PATENT DOCUMENTS

| | | | | |
|---|---|---|---|---|
| 3,625,815 A | * | 12/1971 | Fishman | 376/216 |
| 4,099,554 A | * | 7/1978 | Haese | 165/299 |
| 4,470,948 A | * | 9/1984 | Aanstad et al. | 376/216 |
| 4,859,401 A | * | 8/1989 | Murase et al. | 376/282 |
| 4,927,598 A | * | 5/1990 | Nishino et al. | 376/306 |
| 4,940,564 A | * | 7/1990 | Aizawa et al. | 376/306 |
| 4,948,551 A | * | 8/1990 | Onfroy | 376/210 |
| 5,006,303 A | * | 4/1991 | Rowlands | 376/281 |
| 5,271,044 A | * | 12/1993 | Hidaka et al. | 376/214 |
| 5,276,720 A | * | 1/1994 | Oosterkamp et al. | 376/283 |
| 5,368,633 A | * | 11/1994 | Foldyna et al. | 376/314 |
| 5,398,268 A | * | 3/1995 | Ibe et al. | 376/245 |
| 5,439,577 A | * | 8/1995 | Weres et al. | 204/268 |
| 5,892,805 A | * | 4/1999 | Yamane et al. | 376/305 |
| 6,202,703 B1 | * | 3/2001 | Kuroda et al. | 138/178 |

* cited by examiner

Primary Examiner—Charles T. Jordan
Assistant Examiner—Jordan M Lofdahl
(74) Attorney, Agent, or Firm—Antonelli, Terry, Stout & Kraus, LLP

(57) ABSTRACT

A turbine generator has a water cooling system for cooling the inside of a stator coil with water, wherein the water cooling system includes a water storage tank for storing water; pipes connecting the water storage tank and the stator coil, the pipes being provided in an inlet side and in an outlet side; a decarbonated air injection unit connected to the inlet side of the pipe by a pipe or a decarbonated air injection unit connected to the water storage tank; a heater for heating the water, the stator coil having an oxide film on a surface in contact with the water, the oxide film being formed before starting operation of the generator by high temperature water injected with the decarbonated air and heated by the heater; and a control unit for effecting control so that the decarbonated air is always and continuously injected into the cooling water during operation of the generator.

11 Claims, 6 Drawing Sheets

TURBINE GENERATOR AND OPERATING METHOD THEREOF, AND NUCLEAR POWER PLANT AND OPERATING METHOD THEREOF

BACKGROUND OF THE INVENTION

The present invention relates to a novel turbine generator which is cooled inside with water and comprises stator coils made of a copper group material; and, the invention relates to an operating method of the turbine generator, and a nuclear power plant and an operating method of the nuclear power plant.

In general, with an increase in the capacities of electric machines, cooling of the electric machines becomes important in order to secure their high level of performance and make it possible to reduce their size. As disclosed in Japanese Utility Model No.58-40782 and Japanese Utility Model No. 59-8449, most of the turbine generators for a large scaled nuclear or thermal plant employ a water cooling method in which hydrogen gas is contained inside the machine and water is caused to flow inside the stator coil for cooling hollow wires. The stator coil is composed of a hollow wire made of a material having a major constituent of copper, and the surface is covered with an insulation layer, and the cooling water flows through the inside of the wire. Further, the terminal portion of the stator coil is connected to a connection pipe through a wire box with a solder made of a material having a major constituent of copper.

A water cooling system for cooling the stator coil of a turbine generator constructs a piping circuit by pumping water in a water storage tank using a pump, setting the water temperature to a preset value using a cooler, causing the water to pass through a filter, then supplying the water to the generator so as to cause it to pass through the inside of the stator coil, and finally returning the water to the water storage tank. In order to maintain the purity of the cooling water, the system comprises a purity maintaining circuit for supplying part of the water to an ion exchange resin unit and an exhaust pipe for discharging hydrogen gas accumulated in the water storage tank to the outside of the building.

In the water cooling system of a nuclear turbine generator, when the stator coil made of a copper group material is corroded during operation, there is a possibility that the temperature of the coil will increase to cause an electric breakdown by corrosion products clogging the filter or by the accumulation of corrosion products inside the hollow wire to reduce the flow rate of the cooling water. Therefore, in regard to the water cooling system of a nuclear turbine generator, Japanese Patent Application Laid-Open No. 9-271156 discloses a method wherein, in metallic parts and a heat exchanger made of the copper group material, a cupric oxide (CuO) film is formed on the surface of the metallic parts to improve the corrosion resistance, and Japanese Patent Application Laid-Open No. 10-262351 discloses a method wherein the stator coil is assembled after preforming a cupric oxide (CuO) film on the surface of the coil through oxidation treatment. However, both of the methods improve the corrosion resistance by oxidizing the surface of the stator coil at the initial period to form the cupric oxide (CuO) film, and do not take into consideration the fact that the preformed oxide film is worn during operation to deteriorate the corrosion resistance. On the other hand, Japanese Patent Application Laid-Open No. 9-289750 proposes a method that by supplying a predetermined amount of oxygen into the path of the water cooling system based on a measured result of an amount of dissolved oxygen in the cooling water, it is possible to form and maintain the cupric oxide (CuO) film and to lengthen the lifetime of the stator coil. However, this method has a problem in that a hydrogen explosion may occur in the water storage tank or in the atmosphere discharge pipe of the nuclear turbine generator cooling system depending on the method of introducing oxygen into the cooling water.

The phenomenon that corrosion products produced by corrosion of the copper material of the stator coil clog the filter or accumulate inside the stator coil to reduce the flow rate of the cooling water occurs in a nuclear power plant, but does not occur in a thermal power plant.

SUMMARY OF THE INVENTION

An object of the present invention is to provide a turbine generator having a stator coil made of a copper group material which has high corrosion resistance, and a method of operating the turbine generator, and a nuclear power plant having the turbine generator and a method of operating the nuclear power plant.

The present invention is characterized by a turbine generator comprising a water cooling system for cooling the inside of a stator coil with water, wherein the water cooling system comprises a water storage tank for storing said water; pipes connecting the water storage tank and the stator coil, the pipes being provided in an inlet side and in an outlet side; a decarbonated air injection unit connected to the inlet side of the pipe by a pipe or a decarbonated air injection unit connected to the water storage tank; a heating means for heating the water, the stator coil having an oxide film on a surface in contact with the water, the oxide film being formed before starting operation of the generator by high temperature water injected with decarbonated air and heated by the heating means; and a control unit for effecting control so that the decarbonated air is always and continuously injected into the cooling water during operation of the generator.

Further, the present invention is characterized by a turbine generator comprising a water cooling system for cooling the inside of a stator coil with water, wherein the water cooling system comprises a heating tank for heating and storing the water, and for supplying the water to the water storing tank; a filter for removing solid objects in the water before supplying the water to the stator coil; an ion exchange resin unit for removing ions in the water; an oxygen concentration meter for measuring the oxygen content in the water which has passed through the filter, the stator coil having an oxide film on a surface in contact with the water, the oxide film being formed before starting operation of the generator by high temperature water injected with decarbonated air and heated by the heating tank; and a control unit for controlling the decarbonated air to be always and continuously injected into the cooling water in the stator coil and for controlling the amount of decarbonated air injected into the cooling water based on a signal from the oxygen concentration meter during operation of the generator.

Further, the present invention is characterized by a method of operating a turbine generator comprising the steps of, prior to starting operation of the generator, forming an oxide film on a surface of the stator coil in contact with the water by high temperature water injected with decarbonated air; and, during operation of the generator, always and continuously injecting the decarbonated air into the cooling water.

Furthermore, the present invention is characterized by a method of operating a turbine generator which comprises the steps of, prior to starting operation of the generator, forming an oxide film on a surface of said stator coil in contact with the water by high temperature water above 50° C. injected with decarbonated air; and, during operation of the generator, circulating the cooling water so as to have a dissolved oxygen concentration of 1 to 4 ppm by always and continuously injecting decarbonated air into the cooling water to continuously maintain the oxide film on the inner surface of the coil. The invention also is directed to a method of operating a turbine generator which comprises the steps of, prior to starting operation of the generator, injecting an inert gas into the cooling water using a means for injection an inert gas into the cooling water, the inert gas injecting means being directly connected to a pipe connected to the stator coil, and removing corrosion products inside the stator coil and the pipe using a filter connected to the pipe; after that, before starting operation of the generator, forming an oxide film on a surface of the stator coil in contact with the water by injecting high temperature water above 50° C. with decarbonated air; and, during operation of the generator, circulating the cooling water so as to have a dissolved oxygen concentration of 1 to 4 ppm by always and continuously injecting said decarbonated air into the cooling water to continuously maintain the oxide film on the inner surface of the coil.

The present invention is characterized by a nuclear power plant comprising a nuclear reactor; a steam turbine driven by steam obtained by energy from the nuclear reactor; a turbine generator driven by the steam turbine, the turbine generator having a water cooling system for cooling the inside of a stator coil with water, wherein the water cooling system is similar to the above-mentioned water cooling system.

The present invention is directed to a method of operating a nuclear power plant comprising a steam turbine driven by steam obtained by energy from a nuclear reactor; and a turbine generator driven by the steam turbine, the turbine generator having a water cooling system for cooling the inside of a stator coil with water, wherein an oxide film is formed and maintained on a surface of the stator coil by injecting decarbonated air into the cooling water inside the stator coil before starting and during operation of the generator.

That is, the present invention is directed to a system which completely suppresses corrosion when a cupric oxide (CuO) film is formed on the surface of the stator coil in contact with the water and maintains the film, and a method of operating the system. This can be attained by injecting decarbonated air into the piping system connected to the stator coil before and during operation the turbine generator or always and continuously injecting the decarbonated air into the cooling water in the water storage tank during formation of the oxide film to circulate high temperature water, preferably above 50° C. and having a concentration of dissolved oxygen in the cooling water of 1 to 4 ppm, in the cooling water piping system. Further, the present invention can be attained by circulating the water in the cooling water piping system and injecting an inert gas such as nitrogen at predetermined periods to remove corrosion products in the cooling piping system, then injecting the decarbonated air, circulating the high temperature water above 50° C. and having a concentration of dissolved oxygen in the cooling water of 1 to 4 ppm to form the film, and continuously operating the system. It is preferable that the water used is high in purity. The reason for this is to suppress the occurrence of local corrosion, such as pitting corrosion caused by the treatment.

It is preferable that the oxidizing temperature before operation is 50 to 90° C., and it is more effective when the temperature is higher.

Although atmospheric air normally contains carbon oxide gas of 0.04 weight %, it is preferable for the present invention that the amount of carbon oxide in the cooling water is less than 100 ppm, preferably less than 50 ppm, further preferably less than 10 ppm, furthermore preferably 2 ppm.

Since the corrosion reaction electrochemically progress, the electron transfer reaction can be isolated, and, accordingly, the corrosion can be suppressed by isolating the copper using a dielectric substance from an environment the copper is exposed to. Since cupric oxide (CuO) is a dielectric substance having a dielectric constant of 18.1 at room temperature, corrosion of the copper can be suppressed and the discharging rate of corrosion product of cuprous oxide ($CU_2O$) can be drastically reduced by covering the surface with cupric oxide (CuO) which is the most suitable for a hard oxide film capable of being in intimate contact with a metallic material.

The present invention is characterized in that, in a turbine generator cooling system of the nuclear power plant, the turbine generator cooling system comprises a measuring system for monitoring the concentration of dissolved oxygen in the cooling water, the measuring system being disposed in the cooling water system; and a control unit for injecting decabonating air into the cooling water when the monitored concentration of dissolved oxygen in the cooling water indicates that the concentration of dissolved oxygen in the cooling water is below 1 ppm.

According, to the present invention, in the turbine generator, particularly in the turbine generator of a nuclear power plant, it is possible for the corrosion of the stator coil to be suppressed by forming and maintaining an oxide film inside the stator coil during operation, such that various kinds of problems caused by the corrosion can be avoided and the lifetime of the stator coil of the turbine generator can be lengthened.

DESCRIPTION OF THE PREFERRED EMBODIMENTS (Embodiment 1)

Oxidation treatment of a hollow wire made of pure copper was performed using hot water according to the following process. The hollow wire used had a rectangular section, and the opening portion for cooling water flow was 3.5 mm width and 1.5 mm height, and the plate thickness was 1.0 mm, and the wire length was 5 M. A plurality of the hollow wires which had attached scales removed by acid-washing were bundled, and an inlet port for hot water was formed in one end of the bundled wires to conduct the water. Table 1 shows the oxidation treatment conditions of an air saturation condition (concentration of dissolved oxygen 4 ppm) and an oxygen saturation condition (concentration of dissolved oxygen 20 ppm) in hot water. The table also shows results of the corrosion rate and the discharge rate of corrosion products after a 100 hour corrosion test using the samples after oxidation treatments that were conducted using pure water having a temperature of 65° C., a velocity of 1.8 m/s, and a concentration of dissolved oxygen of 10 ppb. The corrosion rate and the discharge rate of corrosion products were drastically reduced by performing the oxidation treatment. Particularly, the treatment under the oxygen saturation condition was more effective.

TABLE 1

| No. | Oxidation Treatment Condition ||| Discharge ||  |
|-----|------|------|------|------|------|------|
|     | Composition of hot water | Temp. (° C.) | Time (h) | Corrosion rate (mg/m$^2$d) | rate of CP (mg/m$^2$d) | Remark |
| 1 | Pure water (air saturation) | 65 | 170 | 200 | 0.56 | Present Invention |
| 2 | Pure water (oxygen saturation) | 65 | 170 | 90 | 0.10 |  |
| 3 | Without oxidation treatment | — | — | 1000 | 2.84 | Comparative Example |

Next, the corrosion resistance of the oxidation treated samples was examined through a long term corrosion test.

Figure 3:
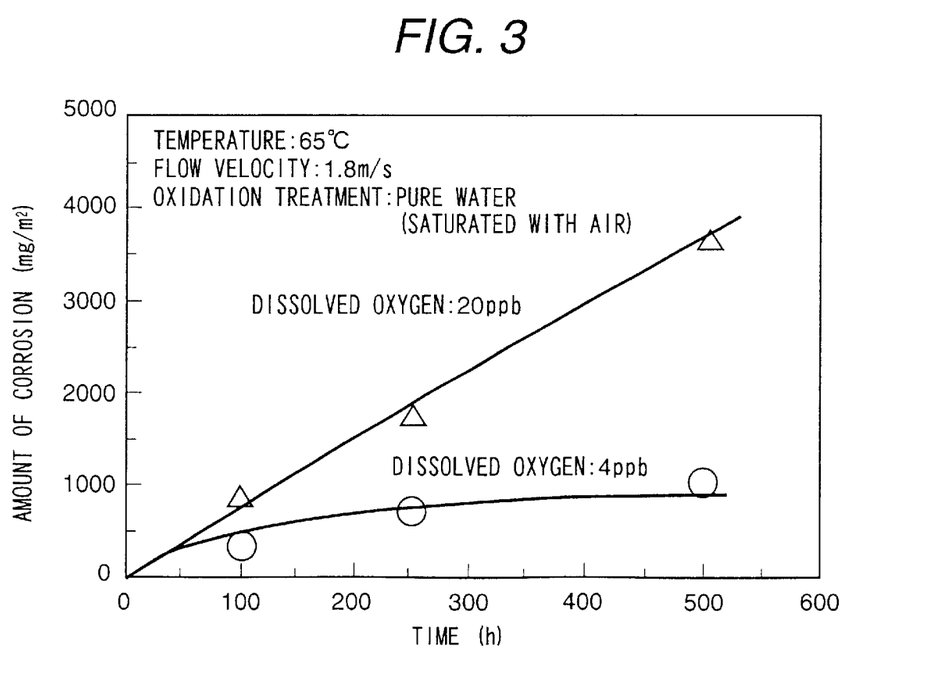
FIG. 3 is a graph showing a time-varying change in a corrosion amount of cooper in the present invention.
Figure 4:
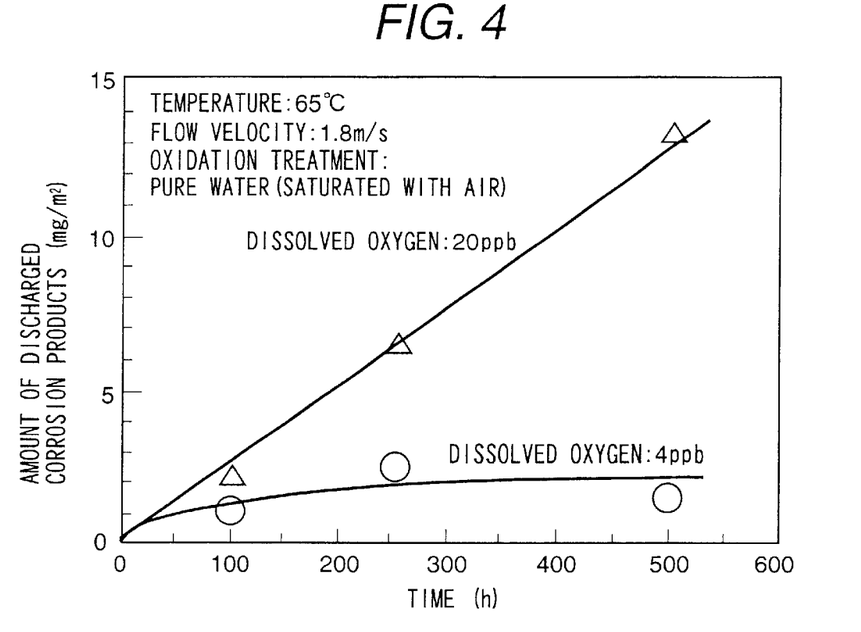
FIG. 4 is a graph showing a time-varying change in a discharge amount of corrosion products in the present invention.

FIG. 3 is a graph showing the time-varying change in a corrosion amount of the cooper samples which were oxidation treated under an air saturation condition; and FIG. 4 is a graph showing the time-varying change in a discharge amount of corrosion products of the samples similarly oxidation treated under an air saturation condition. The test was conducted by injecting air into pure water at conditions of a temperature of 65° C., and a flow velocity of 1.8 m/s in the case of a concentration of dissolved oxygen in the water of 4 ppm and in the cases of a de-aerated condition (20 ppb) obtained by injecting nitrogen gas. It can be understood from the figure that the amount of corrosion and the amount of corrosion product discharge in the case of maintaining an air saturation condition (4 ppm) according to the present invention were drastically reduced compared to the case of 20 ppb. As described above, it can be understood that the amount of corrosion and the amount of corrosion product discharge can be largely reduced by always injecting air into the test liquid.

Figure 5:
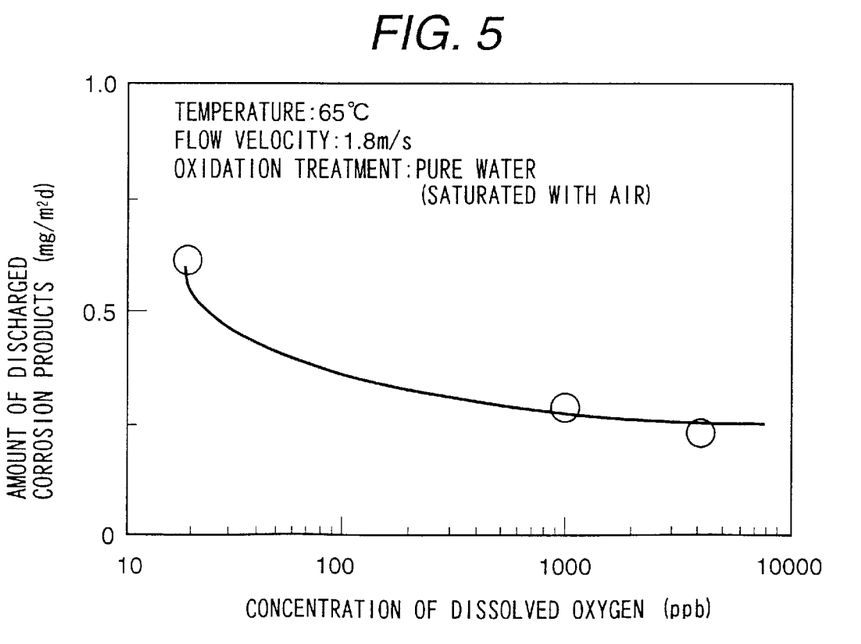
FIG. 5 is a graph showing the relationship between concentration of dissolved oxygen and discharging rate of corrosion products in the present invention.

FIG. 5 shows a result of studying the effect of the concentration of dissolved oxygen in the liquid on the discharging rate of corrosion products. It can be understood from the figure that the amount of corrosion and the amount of corrosion product discharge can be largely reduced by maintaining the concentration of dissolved oxygen in the liquid from 1 ppm to 4 ppm of the air saturation condition. In the case of injecting air into the liquid, the concentration of dissolved oxygen can not exceed this value. Since the electric conductivity of the water may be increased by the effect of carbon oxide of contained to approximately 0.04% in atmospheric air, it is necessary to use the decarbonated air as the injected air.

(Embodiment 2)

Figure 1:
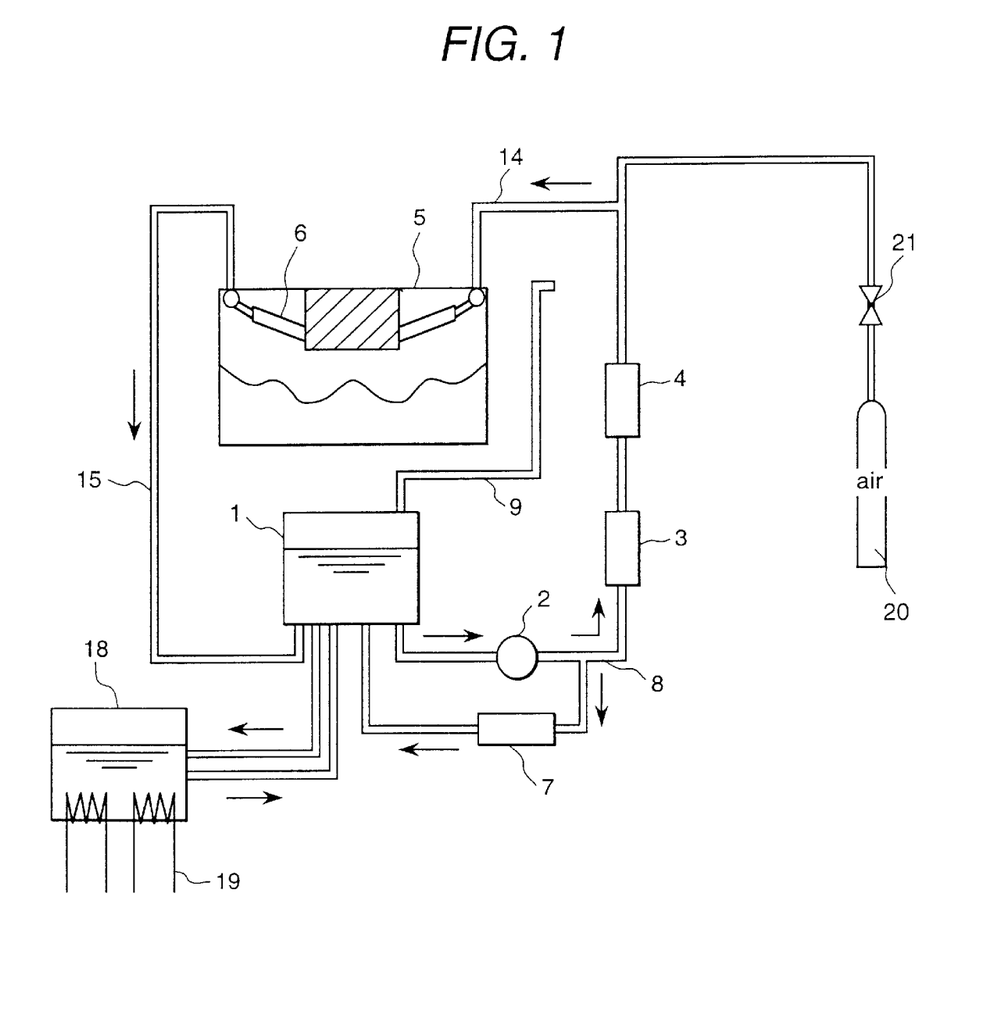
FIG. 1 is a system diagram showing an embodiment of a turbine generator water cooling system of a nuclear power plant in accordance with the present invention.

FIG. 1 is a system diagram showing an embodiment of a turbine generator water cooling system of a nuclear power plant in accordance with the present invention. The water cooling system of the turbine generator forms a piping circuit by pumping water in a water storage tank 1 using a pump 2, setting the water temperature to a preset value using a cooler 3, causing the water to pass through a filter 4, then supplying the water to the generator 5 so as to pass through the inside of the stator coil 6, and finally returning the water to the water storage tank 1. A heater tank 18 and a heating heater 19 are provided in order to increase the water temperature in the water storage tank, and an air cylinder 20 and an air supply valve 21 are provided in order to inject air into the cooling system. The nuclear power plant of the present embodiment comprises a nuclear reactor, a steam turbine driven by steam obtained by energy from the nuclear reactor, and a turbine generator driven by the steam turbine and having the water cooling system for cooling the inside of the stator coil 6 with water, though these components Are not shown in the figure. The water cooling system comprises the water storage tank 1 for storing the water; an inlet side pipe 14 and an outlet side pipe 15 connecting the water storage tank 1 and the stator coil 6; and a decarbonated air injecting unit 20 connected to the inlet side pipe 14. By means of the closed structure, the decarbonated air can be injected into the water in the stator coil. The decarbonated air injecting unit 20 has a control unit, not shown, for controlling the supply of the decarbonated air. The control unit effects control to always and continuously inject the decarbonated air into the water cooling system while the oxide film is being formed on the surface of the stator coil 6 before operating the generator and while the generator is under operation.

Figure 2:
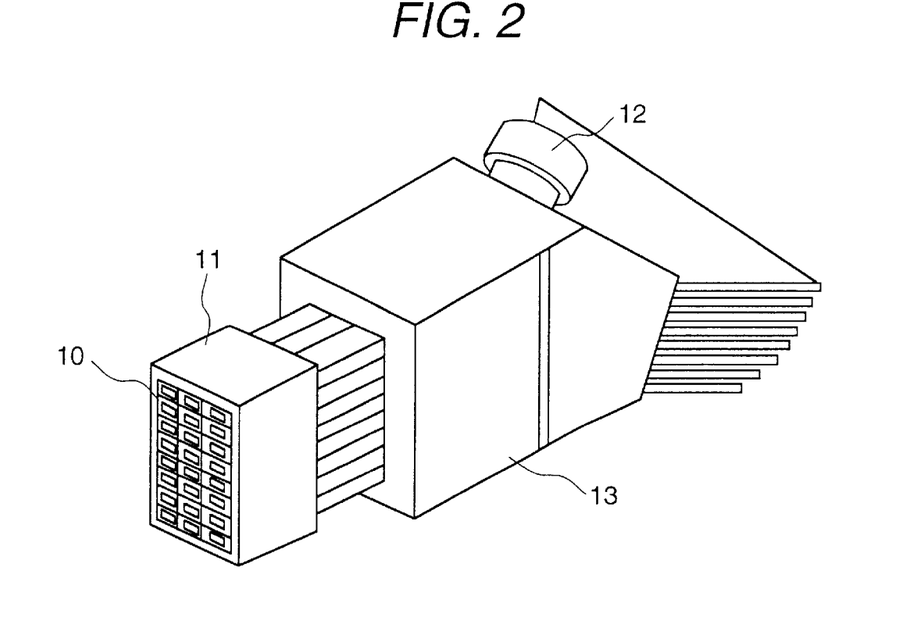
FIG. 2 is a perspective view showing a stator coil of the turbine generator water cooling system.

Further, in order to maintain the purity of the cooling water, the system has a purity maintaining circuit 8 for supplying part of the water to an ion exchange resin unit 7 and an exhaust pipe 9 for discharging hydrogen gas accumulated in the water storage tank to the outside of the building. As shown in FIG. 2, the stator coil 6 is composed of pipes 10 formed of hollow wires made as a major constituent of copper, and the surface of the stator coil is covered with an insulation layer 11, so that the cooling water flows through the inside of the wire. Further, a terminal portion of the stator coil is connected to a connection pipe 12 through a wire box 13 with a solder made of a material having a major constituent of copper.

The oxidizing treatment of the portion exposed to the water in the stator coil of the turbine generator before operation and during operation is performed according to the following procedure. Initially, the procedure for forming the cupric oxide (CuO) film on the surface of the coil before operation will be described.

1) The water in the heater tank 18 is heated up to 50 to 90° C. using heating heater 19, and is supplied to the water storage tank 1.
2) The water is circulated from the storage tank 1 to the cooling water piping.
3) While the water is being circulated through the cooling water piping, the decarbonated air is injected continuously or at predetermined periods into the cooling water piping using the decarbonated air injecting unit 20.

In the present embodiment, the decarbonated air used contains carbon oxide gas of 100 ppm, and the duration time of the injection is approximately 20 hours, and the injecting is performed for about 15 minutes at one-hour intervals. However, it is preferable to always and continuously inject the air during the period of the oxidation treatment. In that case, if an instrumentation air or a decarbonated air containing carbon oxide less than 0.5 ppm is used as the air source, it is possible to effectively suppress an increase in the electrical conductivity of the water and the corrosion of the copper.

When the oxide substances attached onto the portion of the stator coil in contact with the water are washed and removed, an inert gas of nitrogen is supplied to the water instead of the decarbonated air shown in FIG. 1. After removing the oxide substances attached onto the portion of the stator coil in contact with the water during operation of the turbine generator using the water in which inert gas, such as nitrogen is injected, the oxidation treatment is performed. The oxidation treatment is performed according to the following procedure. Initially, the procedure for removing the attached oxide substances will be described.

4) A supplied amount of the water circulated from the water storage tank 1 to the cooling water piping is increased to nearly 5 times as much as the amount used in normal operation. For example, in a case where the water is normally circulated at a flow rate of 500 L/min, the supplied amount of the water is set to 3000 L/min.

5) After circulating the water for approximately 5 hours under the condition described in the item 4), nitrogen is injected into the cooling water piping for approximately 15 minutes to increase the washing effect caused by the bubbling effect.

6) The circulation of water is stopped, and the inside of the piping is inspected.

7) After repeating the processes 4) to 6) three times, the filter 4 is exchanged.

8) By repeating the processes 4) to 7) three times, the inside of the piping is washed.

9) The circulation of water in the cooling water piping is stopped, and the water in the piping and the water storage tank is drained.

10) Water is newly supplied to the water storage tank.

11) By performing the processes 1) to 3), the oxidation treatment of the inside of the cooling water piping is performed.

The cupric oxide (CuO) film is formed on the surface of the stator coil in contact with the water after performing the oxidation treatment of the above-mentioned processes under a condition similar to Embodiment 1. The stator coil having the formed cupric oxide (CuO) film having a dark brown color can maintain the performance of the turbine generator because the corrosion does not progress during operation of the generator and the discharge of corrosion products is suppressed, and accordingly a highly reliable turbine generator can be provided. In a case of a newly installed coil, the same effect can be attained by omitting the washing process for removing attached oxide substances described above and only by performing the process of continuously forming the cupric oxide (CuO) film.

Table 2 shows a result of comparing the progress of corrosion in the stator coils for the cases with and without the oxidation treatment of the inside of the stator coil when a turbine generator is operated. It was verified that the oxidation treatment in accordance with the present invention could reduce the corrosion rate of the stator coil to nearly 1/20, and the discharge rate of corrosion products discharged from the stator coil to nearly 1/5.

TABLE 2

|  | Corrosion Rate $(mg/m^2 \cdot d)$ | CP Discharge Rate $(mg/m^2 \cdot d)$ |
| --- | --- | --- |
| W/O Treatment | 2300 | 0.23 |
| W Treatment | 130 | 0.05 |

During operation, the control unit controls the injection of the decarbonated air into the cooling water so as to always and continuously operate during the period.

Therefore, continuously maintaining the cupric oxide (CuO) film on the stator coil can provide a highly reliable turbine generator capable of maintaining the performance in a good condition because the corrosion does not progress during operation of the generator and the discharge of corrosion products is suppressed.

Figure 6:
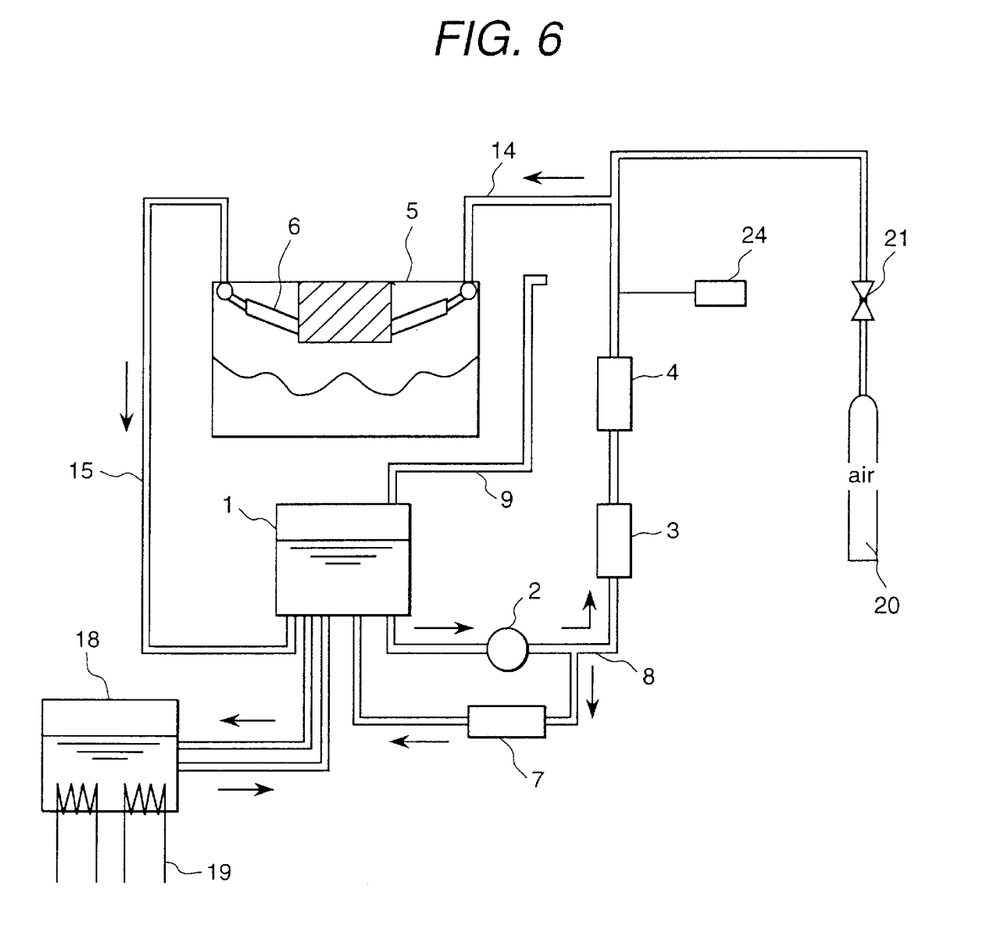
FIG. 6 is a system diagram showing another embodiment of a turbine generator water cooling system of a nuclear power plant in accordance with the present invention.

FIG. 6 is a system diagram showing a turbine generator water cooling system of a nuclear power plant having a dissolved oxygen concentration meter 24 in the cooling water system, similar to the turbine generator water cooling system FIG. 1. The dissolved oxygen concentration is measured and always monitored using the dissolved oxygen concentration meter 24. When the concentration of dissolved oxygen in the cooling water is below 1 ppm, the decarbonated air is injected into the cooling water to always maintain the concentration of dissolved oxygen in the cooling water to 1 to 4 ppm.

Figure 7:
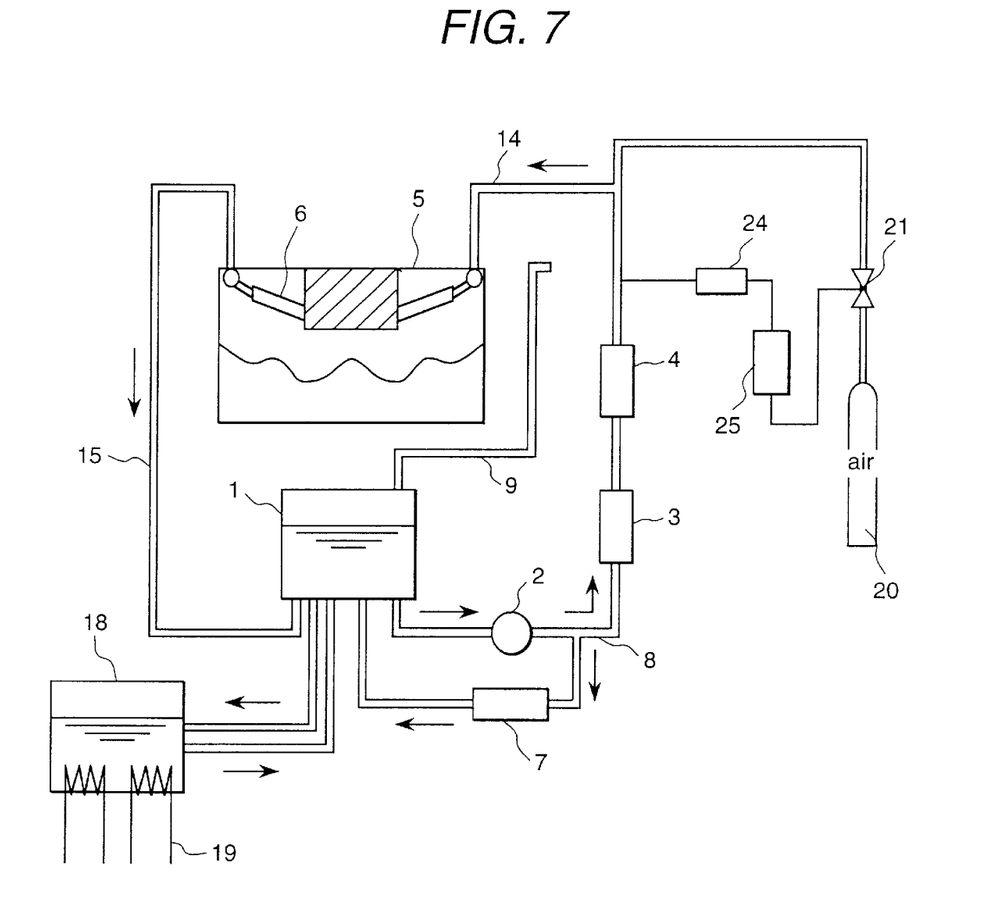
FIG. 7 is a system diagram showing another embodiment of a turbine generator water cooling system of a nuclear power plant in accordance with the present invention.

FIG. 7 shows another embodiment of a turbine generator water cooling system of a nuclear power plant in which the dissolved oxygen concentration meter 24 is provided to measure the concentration of dissolved oxygen in the cooling water, similar to the embodiment of FIG. 6, and the signal (change in the dissolved oxygen concentration) output from the dissolved oxygen concentration meter 24 is processed by a PID controller 25 performing proportional, integral and differential operation, and then the air supply valve 21 is electrically controlled by the PID controller. For example, in a case where the dissolved oxygen concentration in the cooling water is set to 4 ppm, the dissolved oxygen concentration in the cooling water is always maintained at 4 ppm by controlling the supply amount of the air supplied to the cooling water system through the controlled air supply valve.

By applying the present invention, it is possible to provide a highly reliable turbine generator which is capable of maintaining the performance in a good condition because the cupric oxide (CuO) film can be continuously maintained, the corrosion will not be progress during operation of the generator, and the discharge of corrosion products can be suppressed.

Figure 8:
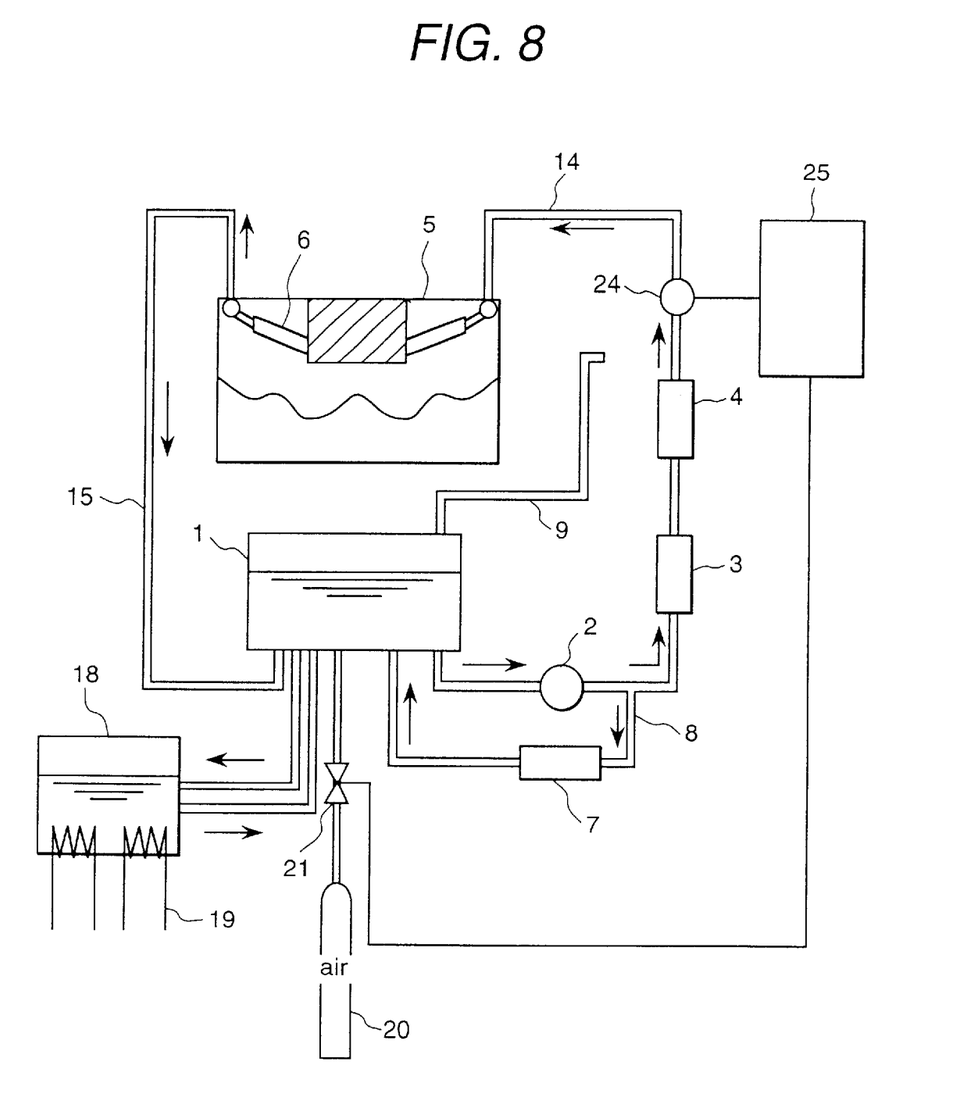
FIG. 8 is a system diagram showing a further embodiment of a turbine generator water cooling system of a nuclear power plant in accordance with the present invention.

FIG. 8 is a system diagram showing a further embodiment of a turbine generator water cooling system of a nuclear power plant in accordance with the present invention. A different point in the present embodiment from that of FIG. 7 is that the decarbonated air unit 20 is connected to the water storage tank with a pipe. The operating method of the water cooling system of the present embodiment before operation and during operation is similar to that of Embodiment 2, and the same effect as that indicated above can be obtained.

What is claimed is:

1. A turbine generator comprising a water cooling system for cooling an inside of a stator coil with water, wherein said water cooling system comprises:

a water storage tank for storing said water;

pipes connecting between said water storage tank and said stator coil, said pipes being provided in an inlet side and in an outlet side;

at least one of (a) a decarbonated air injection unit connected to said inlet side of said pipe by a pipe and (b) a decarbonated air injection unit connected to said water storage tank;

a heating means for heating said water, said stator coil having an oxide film on a surface in contact with said water, said oxide film being formed before starting operation of said generator by high temperature water injected with said decarbonated air and heated by said heating means; and a control unit for controlling so that said decarbonated air is always and continuously injected into said cooling water during operation of said generator.

2. A turbine generator comprising a water cooling system for cooling an inside of a stator coil with water, wherein said water cooling system comprises:

a water storage tank for storing said water;

pipes connecting between said water storage tank and said stator coil, said pipes being provided in an inlet side and in an outlet side;

at least ore of (a) a decarbonated air injection unit connected to said inlet side of said pipe by a pipe and (b) a decarbonated air injection unit connected to said water storage tank;

a heating tank for heating and storing said water, and for supplying said water to said water storing tank;

a filter for removing solid objects in said water before supplying said water to said stator coil;

an ion exchange resin unit for removing ions in said water;

an oxygen concentration meter for measuring an oxygen content in said water which has passed through said filter, said stator coil having an oxide film on a surface in contact with said water, said oxide film being formed before starting operation of said generator by high temperature water injected with said decarbonated air and heated by said heating tank; and a control unit for controlling said decarbonated air to be always and continuously injected into said cooling water in said stator coil and for controlling an amount of said decarbonated air injected into said cooling water based on a signal from said oxygen concentration meter during operation of said generator.

3. A method of operating a turbine generator comprising a stator coil an inside of which is cooled with water, the method comprising the steps of:

before starting operation of said generator, forming an oxide film on a surface of said stator coil in contact with said water by high temperature water injected with decarbonated air; and during operation of said generator, always and continuously infecting said decarbonated air into said cooling water.

4. A method of operating a turbine generator comprising a stator coil an inside of which is cooled with water, the method comprising the steps of:

before starting operation of said generator, forming an oxide film on a surface of said stator coil in contact with said water by high temperature water above 50° C. injected with decarbonated air; and during operation of said generator, circulating said cooling water so as to have a dissolved oxygen concentration of 1 to 4 ppm by always and continuously injecting said decarbonated air into said cooling water to continuously maintain said oxide film on the inner surface of said coil.

5. A method of operating a turbine generator comprising a stator coil an inside of which is cooled with water, the method comprising the steps of:

before starting operation of said generator, injecting an inert gas into said cooling water using an inert gas injecting leans to said cooling water, said inert gas injecting means being directly connected to a pipe connected to said stator coil, and removing corrosion products inside said stator coil and said pipe using a filter connected to said pipe;

after that, before starting operation of said generator, forming an oxide film on a surface of said stator coil in contact with said water by high temperature water above 50° C. injected with decarbonated air; and during operation of said generator, circulating said cooling water so as to have a dissolved oxygen concentration of 1 to 4 ppm by always and continuously injecting said decarbonated air into said cooling water to continuously maintain said oxide film on the inner surface of said coil.

6. A method of operating a turbine generator according to any one of claims 3 to 5, the method further comprising the steps of:

measuring a concentration of oxygen dissolved in said cooling water; and controlling an injecting amount of said decarbonated air based on said measured concentration of oxygen.

7. A method of operating a turbine generator according to claim 6, wherein said decabonating air is injected into said cooling water so that the concentration of oxygen dissolved in said cooling water does not become below 1 ppm.

8. A nuclear power plant comprising a nuclear reactor; a steam turbine rotated by steam obtained by energy from said nuclear reactor; a turbine generator rotated by said steam turbine, said turbine generator having a water cooling system for cooling an inside of a stator coil with water, wherein said water cooling system comprises:

a water storage tank for storing said water;

pipes connecting between said water storage tank and said stator coil, said pipes being provided in an inlet side and in an outlet side;

at least one of (a) a decarbonated air injection unit connected to said inlet side of said pipe by a pipe and (b) a decarbonated air injection unit connected to said water storage tank;

a heating means for heating said water, said stator coil having an oxide film on a surface in contact with said water, said oxide film being formed before starting operation of said generator by high temperature water injected with said decarbonated air and heated by said heating means; and a control unit for controlling so that said decarbonated air is always and continuously injected into said cooling water during operation of said generator.

9. A nuclear power plant comprising a nuclear reactor; a steam turbine rotated by steam obtained by energy from said nuclear reactor; a turbine generator rotated by said steam turbine, said turbine generator having a water cooling system for cooling an inside of a stator coil with water, wherein said water cooling system comprises:

a water storage tank for storing said water;

pipes connecting between said water storage tank and said stator coil, said pipes being provided in an inlet side and in an outlet side;

at least one of (a) a decarbonated air injection unit connected to said inlet side of said pipe by a pipe and (b) a decarbonated air injection unit connected to said water storage tank;

a heating tank for heating and storing said water, and for supplying said water to said water storing tank;

a filter for removing solid objects in said water before supplying said water to said stator coil;

an ion exchange resin unit for removing ions in said water;

an oxygen concentration meter for measuring an oxygen content in said water, said stator coil having an oxide film on a surface in contact with said water which has passed through said filter, said oxide film being formed before starting operation of said generator by high temperature water injected with said decarbonated air and heated by said heating tank; and a control unit for controlling said decarbonated air to be always and continuously injected into said cooling water in said stator coil and for controlling an amount of said decarbonated air injected into said cooling water based on a signal from said oxygen concentration meter during operation of said generator.

10. A method of operating a nuclear power plant comprising a nuclear reactor; a steam turbine rotated by steam obtained by energy from said nuclear reactor; a turbine generator rotated by said steam turbine, said turbine generator having a water cooling system for cooling an inside of a stator coil with water, the method comprising the steps of:

before starting operation of said generator, forming an oxide film on a surface of said stator coil in contact with said water by high temperature water above 50° C. injected with decarbonated air; and during operation of said generator, circulating said cooling water so as to have a dissolved oxygen concentration of 1 to 4 ppm by always and continuously injecting said decarbonated air into said cooling water to continuously maintain said oxide film on the inner surface of said coil.

11. A method of operating a nuclear power plant comprising a nuclear reactor; a steam turbine rotated by steam obtained by energy from said nuclear reactor; a turbine generator rotated by said steam turbine, said turbine generator having a water cooling system for cooling an inside of a stator coil with the method comprising the steps of:

before starting operation of said generator, injecting an inert gas into said cooling water using an inert gas injecting means to said cooling water, said inert gas injecting means being directly connected to a pipe connected to said stator coil, and removing corrosion products inside said stator coil and said pipe using a filter connected to said pipe;

after that, before starting operation of said generator, forming an oxide film on a surface of said stator coil in contact with said water by high temperature water above 50° C. injected with decarbonated air; and during operation of said generator, circulating said cooling water so as to have a dissolved oxygen concentration of 1 to 4 ppm by always and continuously injecting said decarbonated air into said cooling water to continuously maintain said oxide film on the inner surface of said coil.

* * * * *